United States Patent Office 3,219,420
Patented Nov. 23, 1965

3,219,420
FLUIDISED BED REACTORS
Alexander F. Dielenberg, 1212 Richmond Gardens,
Kitwe, Northern Rhodesia
Filed Aug. 11, 1961, Ser. No. 130,917
6 Claims. (Cl. 23—284)

The present invention relates to fluidised bed reactors thereby solids are contacted with gases in accordance with the so-called fluidised solids technique.

The throughput of conventional reactors is limited for roasted end products by a space rate, calculated by measuring linearly the velocity of the uprising gases as if the gases were passing through a reactor devoid of solids. If the space rate is increased to too high a value it can have one of two consequences; namely, the fluidised bed will be blown out of the reactor or the particles will be incompletely roasted. These factors automatically limit the throughput.

According to the present invention, there is provided a fluidising bed reactor comprising means for inducing a restricted area of higher turbulence in the form of a vortex above the fluidised bed.

Figure 1:
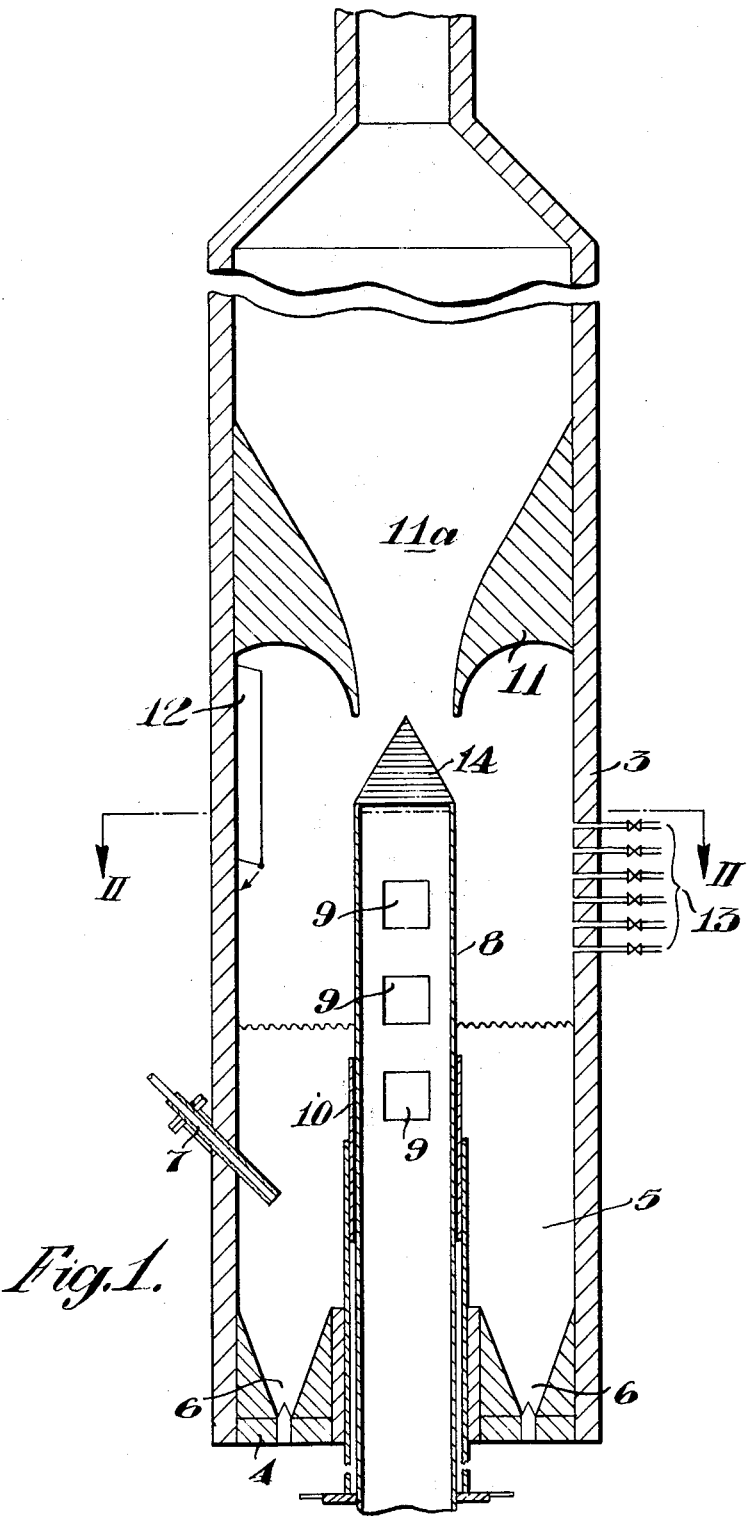
Figure 2:
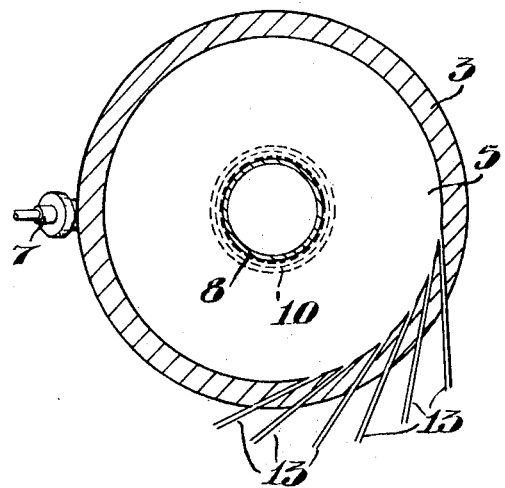

An embodiment of the invention will now be described, by way of example, with reference to the accompanying drawings, in which:

FIGURE 1 is a sectional view of a fluidised bed reactor according to the invention, and FIGURE 2 is a section on the line II—II of FIGURE 1.

Referring to the drawings, a fluidised bed reactor or vortex reactor comprises an outer shell 3 which has a bottom grate 4 above which is maintained within the shell a fluidised bed 5. The grate 4 has a series of conical air inlets 6 formed in a ring to permit the entry of air for fluidising the bed and a feed gun 7 is provided whereby solid material for the fluidised bed can be fed into the reactor. Axially located within the reactor is a central discharge pipe 8 of conical form at its end within the reactor and having three discharge outlets 9 therein. Surrounding the pipe 8 is a slidable sleeve 10. Secured to the inside wall of the shell 3 above the bed 5 is a concentric conical centre piece 11 having a restricted throat 11a and adjustable inclined baffles 12 are secured on the wall between the centre piece 11 and the bed 5. As shown best in FIGURE 2 a series of tangential air inlets 13 are formed in the wall of the shell 3.

In operation of the reactor air is fed via the inlets 6 into the reactor to fluidise the bed 5. At the same time air is fed in via the tangential air inlets 13 and the introduction of air through these inlets induces the formation of a vortex within the reactor, the vortex being stabilised by the conical tip 14 of the central discharge pipe 8. The amount of tangential air blast can be supplied on a sliding scale from a low formation to a high formation of vortex. Usually a 30% excess of air over stoichiometric value is employed for economical roasting.

The vortex centrifuges the bed particles outwards towards the walls of the reactor to classify coarser particles by combined effects of centrifugal force and friction against the walls of the shell 3. The adjustable inclined baffles 12 attached to the reactor walls and mounted in the vortex area above the fluidised bed can be operated to strip down coarser particles in the vortex circuit close to the reactor walls.

The vortex can be depressed by raising the bed level closer to the concentric conical centre piece 11. This operation is effected by raising the adjustable sleeve 10 around the centre discharge pipe 8, so that, for example, the sleeve covers the lowest discharge outlet 9 and discharge from the bed is effected through the centre outlet 9. If it is desired to raise the level of the bed still further the sleeve 10 is raised to cover both the centre and lowest discharge outlets 9 so that the bed level is raised to discharge only through the top outlet 9.

This restriction of the vortex area i.e. the area between the bed level and the centre piece 11, completes the roasting on those particles picked up by the vortex from the top of the fluidised bed and the higher turbulent energy above the bed prevents the tendency of the solids to fuse or to agglomerate. The restriction of the vortex area helps also to stabilise the temperature control. The flow pattern of the restricted high turbulence area above the fluidised bed 5 is highly complex and only a very rough calculation is possible at the present time.

The vortex reactor works at the same economical ratio of power consumption as any conventional reactor but the efficiency of the vortex reactor is many times higher. The restricted high turbulence area above the bed represents practically the super stage of a fluidising bed. To insure a constant fluidised bed 5 the bottom grate 4 is preferably built in the form of a conical ring system with shorter sections between the individual tuyeres or air inlets 6.

This conical ring system delivers a high space rate in the lower portion of the bed 5 and prevents any agglomeration.

The feed which may be wet or dry, can be supplied into the reactor at any point above the grate 4 but preferably is supplied into the middle of the bed 5 as shown in FIGURE 1 to ensure the best contact for catalytic reaction.

*Example*

One example of the operation of the vortex reactor of the present invention will now be described. The rate of decomposition of copper sulphate in calcined particles is controlled mainly by the rate of diffusion of sulphur trioxide (or sulphur dioxide and oxygen) from the interior of the particles to the particle surfaces and from the particle surfaces to the bulk gas phase. By employing a vortex reactor according to the invention to increase the air velocity both these processes are undoubtedly speeded up. This is because firstly the more intense solids agitation produces calcines of finer particles and secondly, because the greater turbulence in the gas phase assists the sulphur trioxide to diffuse away from the particle surfaces. In addition, resulphation of the entrained calcined particles is opposed by the higher temperature of the dust laden gas leaving the reactor. Most of the additional material will be of larger size than that entrained at low velocities. The increased amount of calcine entrained by higher gas velocity will be collected in the cyclones.

The vortex reactor of the present invention, which is based on roasting conditions, will permit increase in throughput proportional to the increased amount of additional air blast.

If the throughput of a conventional reactor with a fluidised bed based on a combined space and feed rate is equal to one unit (say 50 lbs.) per square foot area of the reactor base and the additional tangential air blast is, for example, twice that amount of air delivered to the bottom grate, the feed rate can be increased three times by using the vortex system as explained above. The final throughput will thus be three units (i.e. 150 lbs.) per square foot. The throughput of a reactor of a given size is in direct proportion to the superficial air velocity.

Basically for successful roasting any amount of air from theoretical to high excess may be used in the vortex reactor.

What is claimed is:

1. A reactor comprising a cylindrical vertical shell, a grate disposed adjacent the lower end of said shell, means for introducing material to be treated into said shell above said grate, said grate having means for the introduction of air upwardly into said shell to provide a fluidized bed of said material, means providing a restricted throat in said shell above said bed, a plurality of tangential-flow gas inlets in the wall of said shell between said throat and said bed, and a central discharge pipe projecting upwardly through said grate into said shell, the upper end of said pipe terminating between said gas inlets and said throat, whereby the tangential flow of gas from said gas inlets in conjunction with said throat and said central pipe serves to provide a restricted zone of high turbulence in the form of a vortex above said bed.

2. A reactor as defined in claim 1, in which means is provided for adjusting the level of said bed within said shell.

3. A reactor as defined in claim 2, in which said central pipe is provided with a plurality of vertically spaced discharge outlets and in which said means for adjusting the level of said bed comprises means for selectively closing one or more of said outlets.

4. A reactor as defined in claim 3, in which said last named means comprises a sleeve slidably disposed on said pipe, said sleeve being movable upwardly to progressively close said outlets and movable downwardly to progressively open said outlets.

5. A reactor as defined in claim 1, in which said upper end of said pipe is in the form of a cone, said cone serving to stabilize said vortex.

6. A reactor as defined in claim 1, in which adjustable baffles are mounted on the inner surface of said shell within said restricted zone for stripping down solid particles close to the reactor walls.

References Cited by the Examiner

UNITED STATES PATENTS

| | | | |
|---|---|---|---|
| 1,193,783 | 8/1916 | Hillhouse | 75—26 X |
| 1,684,022 | 9/1928 | Hawley. | |
| 2,100,907 | 11/1937 | McGehee et al. | |
| 2,433,798 | 12/1947 | Vorhees. | |
| 2,702,434 | 2/1955 | Richardson et al. | |
| 2,719,112 | 9/1955 | Kearby et al. | |
| 2,740,752 | 4/1956 | Anhorn. | |
| 2,878,102 | 3/1959 | Sternfels | 23—147 |
| 2,990,260 | 6/1961 | Mungen. | |
| 3,026,186 | 3/1962 | Coty. | |

FOREIGN PATENTS 791,631    3/1958    Great Britain.

OTHER REFERENCES

Mellor: Comprehensive Treatise on Inorganic and Theoretical Chemistry, vol. 3, page 132 (1923), Longmans, Green & Co., New York.

MORRIS O. WOLK, *Primary Examiner.*

GEORGE D. MITCHELL, *Examiner.*